United States Patent [19]

Wolf et al.

[11] Patent Number: 5,257,750
[45] Date of Patent: Nov. 2, 1993

[54] FILM CASSETTE WITH NOTCHED FILM LEADER

[75] Inventors: Michael T. Wolf, Rochester; David R. Linne, Brockport; Mark D. Fraser, Hamlin, all of N.Y.

[73] Assignee: Eastman Kodak Company, Rochester, N.Y.

[21] Appl. No.: 886,911

[22] Filed: May 22, 1992

[51] Int. Cl.$^5$ .................................................. G03B 1/04
[52] U.S. Cl. ................................................... 242/71.1
[58] Field of Search ......................... 242/71, 71.1, 71.7, 242/71.9; 354/275; 206/408, 409

[56] References Cited

U.S. PATENT DOCUMENTS

| | | | |
|---|---|---|---|
| 4,883,235 | 11/1989 | Niedospial et al. | 242/71.1 |
| 4,883,236 | 11/1989 | Niedospial et al. | 242/71.1 |
| 5,046,680 | 9/1991 | Niedospial et al. | 242/71.1 |

Primary Examiner—Daniel P. Stodola
Assistant Examiner—John P. Darling
Attorney, Agent, or Firm—Roger A. Fields

[57] ABSTRACT

In a film cassette, a spool is supported for rotation in an unwinding direction inside a cassette shell, a filmstrip is coiled about the spool to form a film roll with an outermost convolution having a leading end, a pair of flanges are coaxially arranged along the spool with respective peripheral annular lips overlapping the outermost convolution adjacent opposite longitudinal edges of the outermost convolution to radially confine the film roll, respective notches are cut in the longitudinal edges at individual locations nearby the leading end which receive sections of the annular lips to allow sections of the longitudinal edges between the notches and the leading end to overlap the annular lips to hold the leading end spaced from a next-inward convolution of the film roll, and a stripper is positioned closer to one of the longitudinal edges than to the other for receipt between the leading end and the next-inward convolution to divert the leading end into a passageway out of the shell when the spool is rotated in the unwinding direction. According to the invention, the notch in the longitudinal edge that is farther from the stripper is sufficiently shallow to cause the section of the annular lip in that notch to bottom out in it to prevent the section of the annular lip in the notch in the longitudinal edge that is closer to the stripper from separating from that notch.

2 Claims, 12 Drawing Sheets

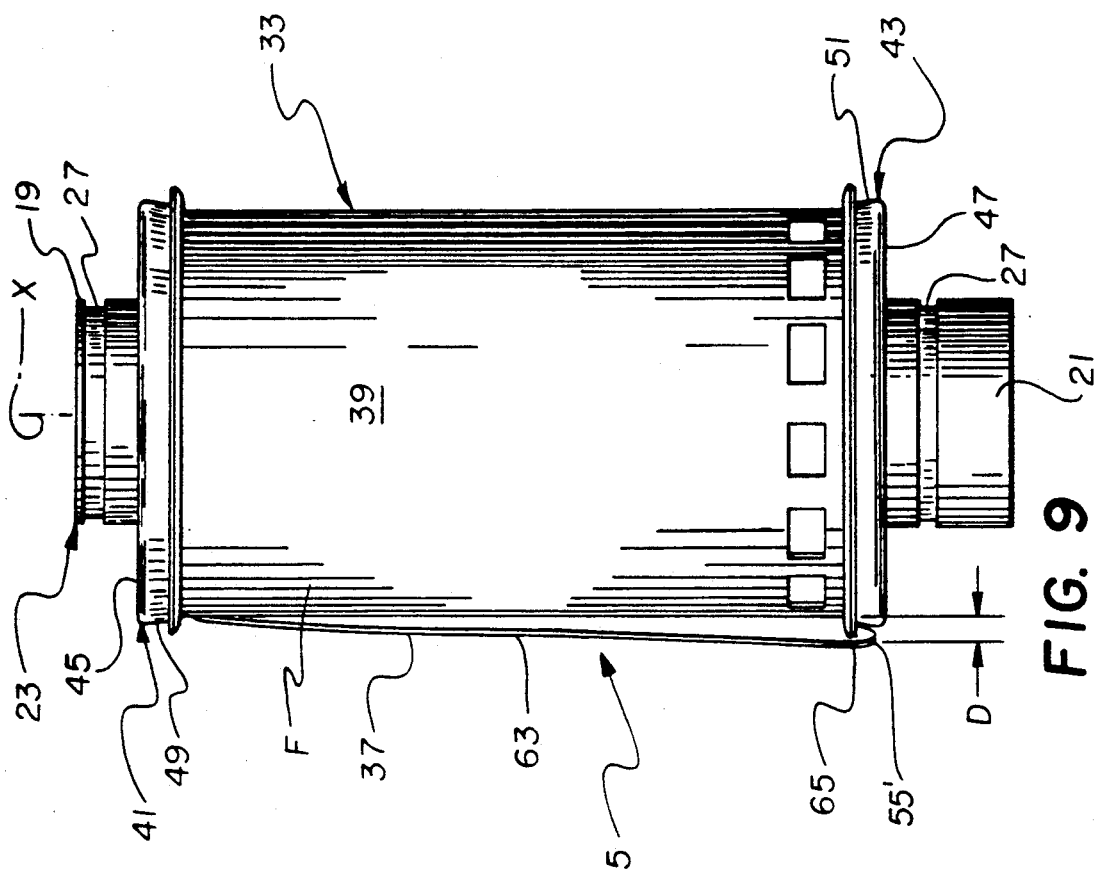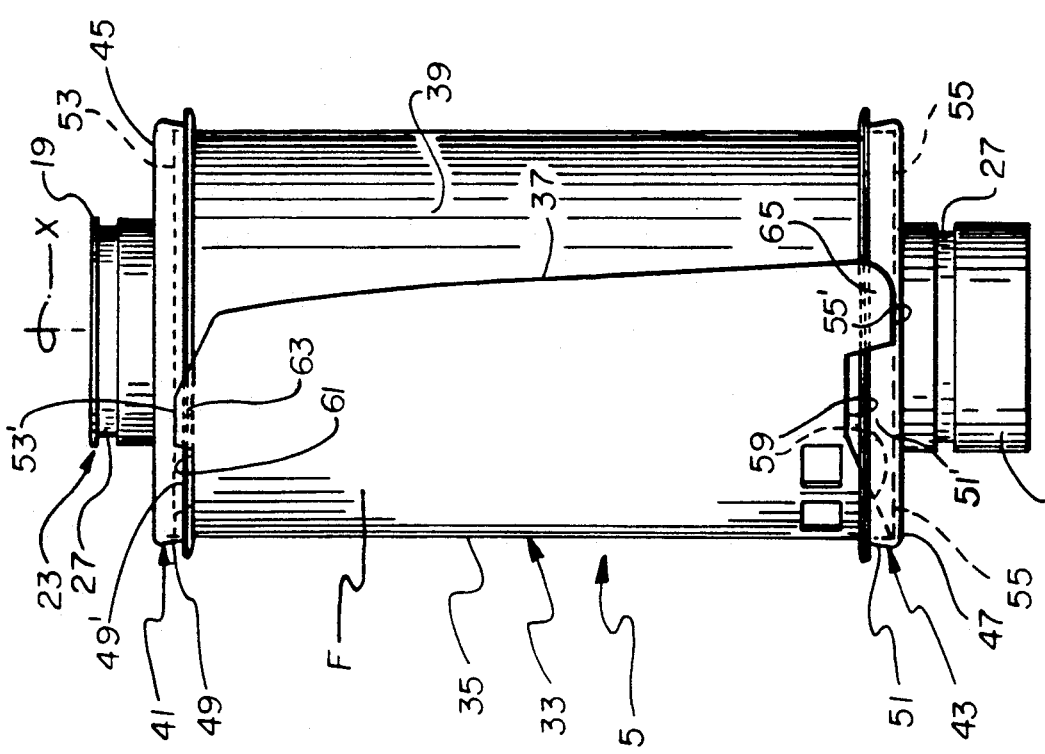

FILM CASSETTE WITH NOTCHED FILM LEADER

BACKGROUND OF THE INVENTION

1. Field of the Invention

The invention relates generally to the field of photography, and in particular to a film cassette containing roll film coiled about a spool. More specifically, the invention relates to a film cassette that is capable of automatically advancing a non-protruding film leader through a passageway out of the cassette shell responsive to unwinding rotation of the spool.

2. Description of the Prior Art

Prior art commonly assigned U.S. Pat. No. 5,046,680, filed Mar. 8, 1990 and issued Sept. 10, 1991, discloses a film cassette wherein a spool is supported for rotation in an unwinding direction inside a cassette shell, a filmstrip is coiled about the spool to form a film roll with an outermost convolution having a leading end, a pair of flanges are coaxially arranged along the spool with respective peripheral annular lips or skirts overlapping the outermost convolution adjacent opposite longitudinal edges of the outermost convolution to radially confine the film roll, respective notches are cut in the longitudinal edges at individual locations nearby the leading end which receive sections of the annular lips to allow sections of the longitudinal edges between the notches and the leading end to overlap the annular lips to hold the leading end spaced from a next-inward convolution of the film roll, and a stripper is positioned closer to one of the longitudinal edges than to the other for receipt between the leading end and the next-inward convolution to divert the leading end into a passageway out of the shell when the spool is rotated in the unwinding direction. If the section of the longitudinal edge that is closer to the stripper is allowed to slip from overlapping the annular lip to behind (inside) the annular lip, the stripper may not fit between the leading end and the next-inward convolution to divert the leading end into the passageway when the spool is rotated in the unwinding direction. Instead, the leading end would be advanced underneath the stripper and could not enter the passageway. This problem may occur with the film cassette disclosed in U.S. Pat. No. 5,046,680 because the outermost convolution can be laterally shifted to separate the section of the annular lip in the notch in the longitudinal edge that is closer to the stripper from that notch.

Prior art commonly assigned U.S. Pat. No. 4,883,236, filed Mar. 8, 1989 and issued Nov. 28, 1989, discloses a film cassette somewhat similar to the film cassette disclosed in U.S Pat. No. 5,046,680. In this instance, however, a compression spring is provided to urge the section of the annular lip in the notch that is closer to the stripper into that notch to prevent the section from separating from the notch (as in U.S. Pat. No. 5,046,680).

SUMMARY OF THE INVENTION

According to the invention, a film cassette comprising a spool supported for rotation in an unwinding direction inside a cassette shell, a filmstrip coiled about the spool to form a film roll with an outermost convolution having a leading end, a pair of flanges coaxially arranged along the spool with respective peripheral annular lips overlapping the outermost convolution adjacent opposite longitudinal edges of the outermost convolution to radially confine the film roll, respective notches cut in the longitudinal edges at individual locations nearby the leading end which receive sections of the annular lips to allow sections of the longitudinal edges between the notches and the leading end to overlap the annular lips to hold the leading end spaced from a next-inward convolution of the film roll, and a stripper positioned closer to one of the longitudinal edges than to the other for receipt between the leading end and the next-inward convolution to divert the leading end into a passageway out of the shell when the spool is rotated in the unwinding direction, is characterized in that:

the notch in the longitudinal edge that is farther from the stripper is sufficiently shallow to cause the section of the annular lip in that notch to bottom out in it to prevent the section of the annular lip in the notch in the longitudinal edge that is closer to the stripper from separating from that notch.

This design solves the problem occurring with the film cassette disclosed in U.S. Pat. No. 5,046,680, and offers a better solution than the compression spring suggested in U.S. Pat. No. 4,883,236.

BRIEF DESCRIPTION OF THE DRAWINGS

FIGS. 8 and 9 are elevation views of the film roll and the film spool, illustrating the manner in which the film roll is originally stored on the film spool;

DETAILED DESCRIPTION OF THE PREFERRED EMBODIMENT

The invention is disclosed as being embodied preferably in a 35 mm film cassette. Because the features of this type of film cassette are generally well known, the description which follows is directed in particular to elements forming part of or cooperating directly with the disclosed embodiment. It is to be understood, however, that other elements not specifically shown or described may take various forms known to persons of ordinary skill in the art.

Figure 1:
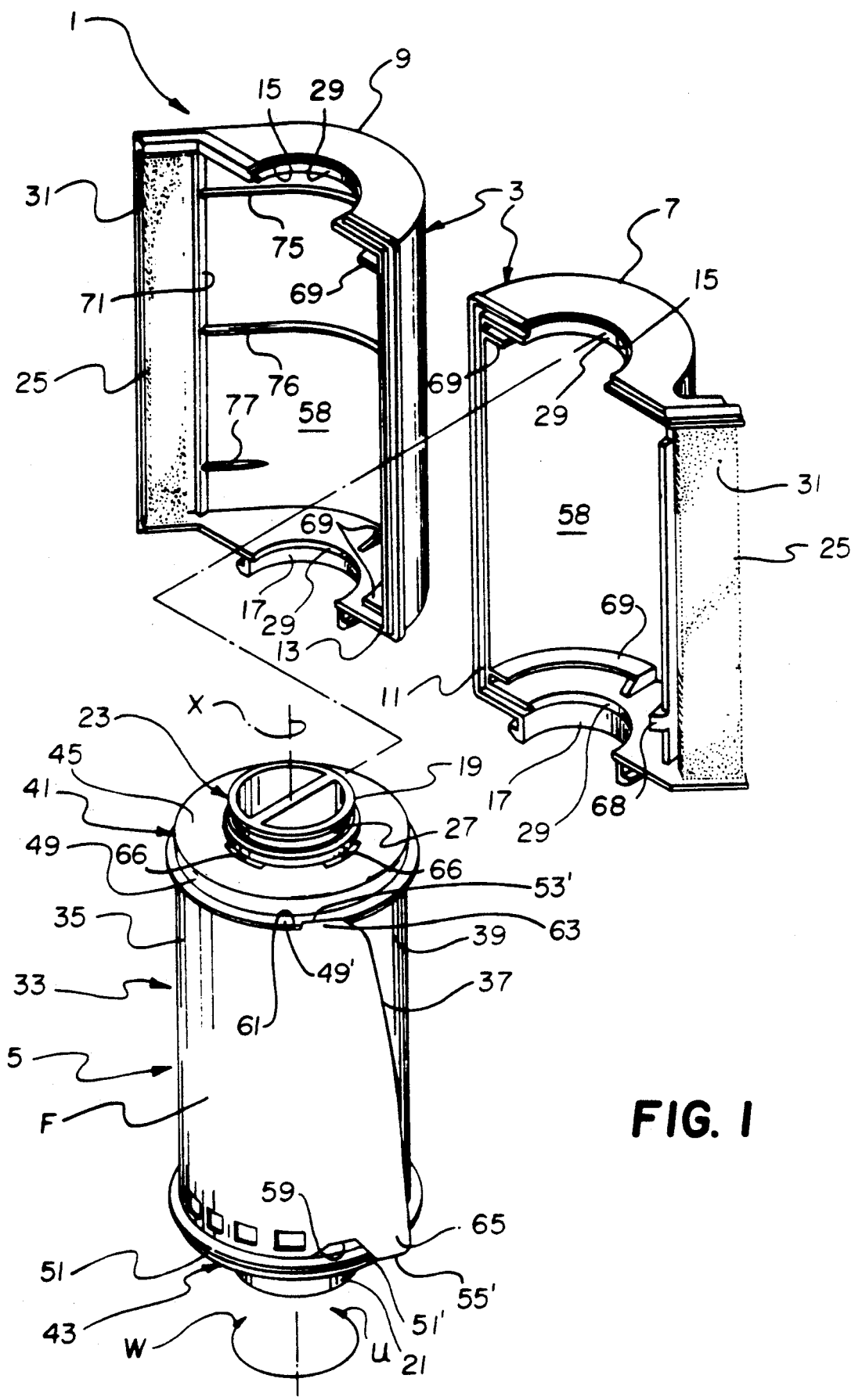
FIG. 1 is an exploded perspective view of a film cassette according to a preferred embodiment of the invention.
Figure 2:
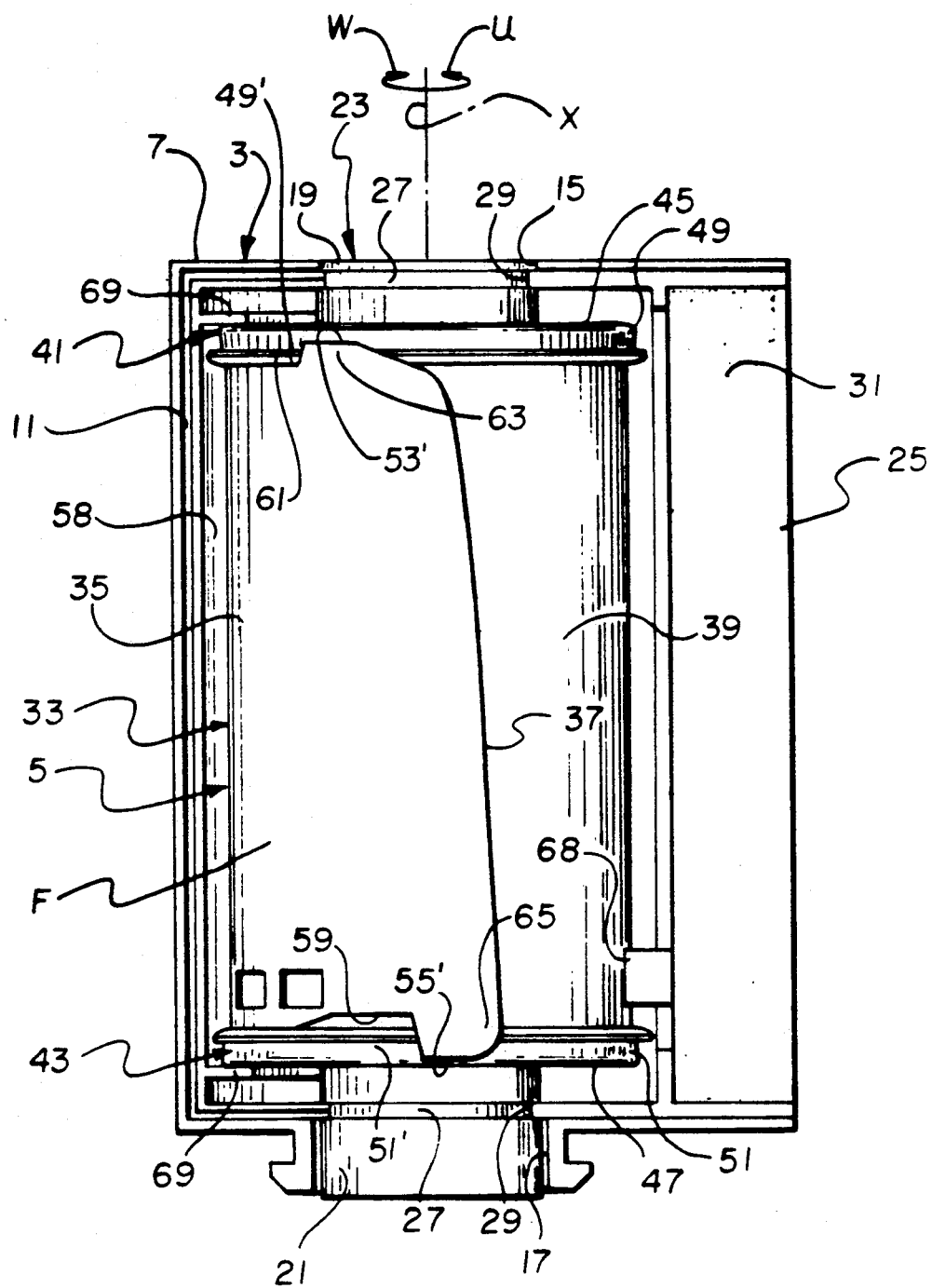
FIG. 2 is an elevation view of the film cassette, illustrating the cassette shell open to reveal a film roll coiled about a film spool.
Figure 12:
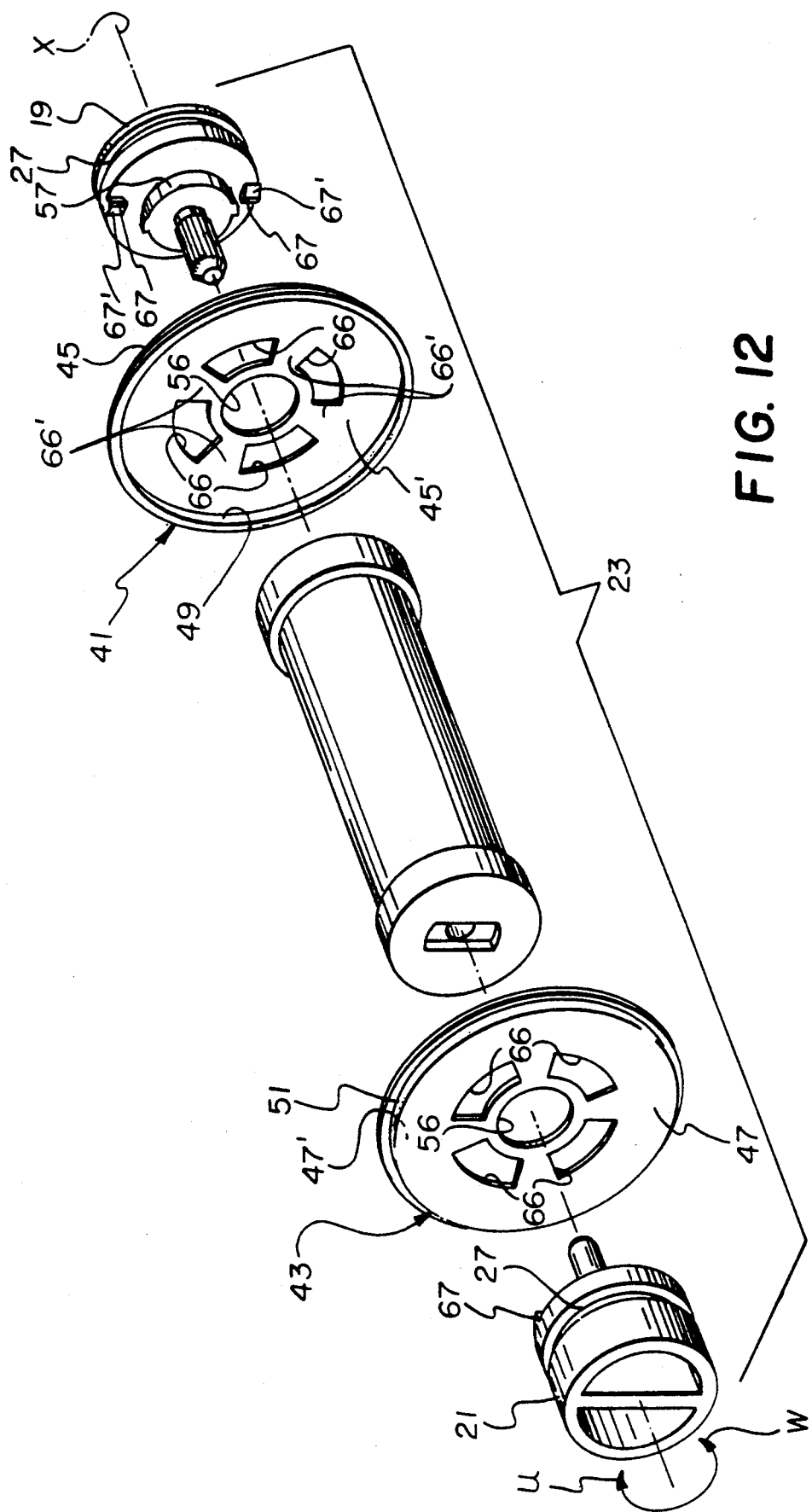
FIG. 12 is an exploded perspective view of the film spool without the film roll.

Referring now to the drawings, FIGS. 1, 2 and 12 depict an improved 35 mm film cassette 1 comprising a light-tight cassette shell 3 and a film spool 5 which is rotatable about an axis X in film unwinding and winding directions U and W within the cassette shell. The cassette shell 3 consists of two shell halves 7 and 9 which are mated along respective grooved and stepped edge portions 11 and 13. The mated halves 7 and 9 define upper and lower aligned circular openings 15 and 17 for relatively shorter and longer opposite open-end pieces 19 and 21 of a spool core or hub 23, and they define a narrow relatively-straight film passageway 25 out of the cassette shell 3. The longer and shorter open-end pieces 19 and 21 of the spool core 23 each include an annular peripheral groove 27 which mates with a corresponding edge portion 29 of the respective openings 15 and 17 in the cassette shell 3 to rotatably support the film spool 5 for rotation about the axis X in the film unwinding and winding directions U and W. A known black velvet or plush material 31 lines the interior of the film passageway 25 to prevent ambient light from entering the film passageway.

Figure 3:
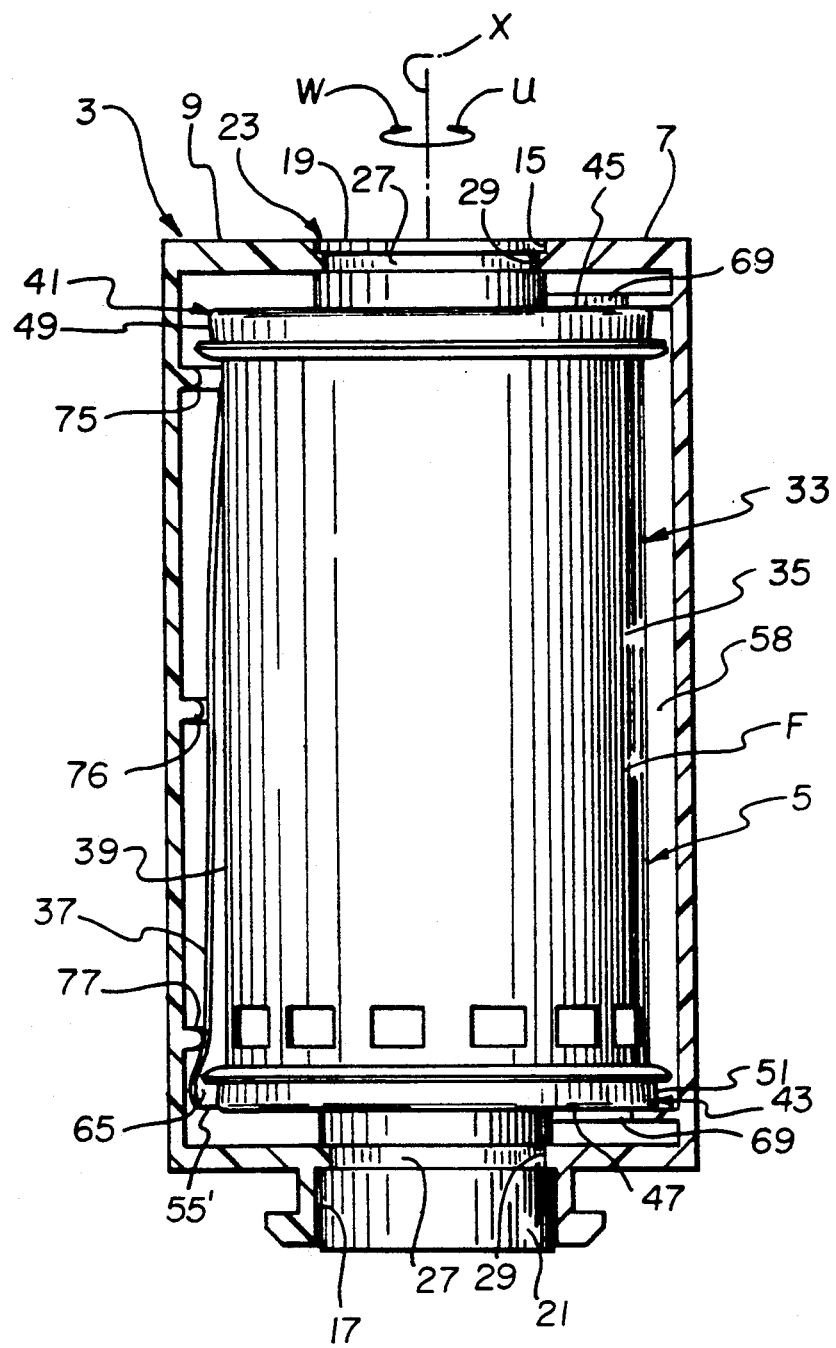
FIG. 3 is an elevation view similar to FIG. 2, through in section.
Figure 13:
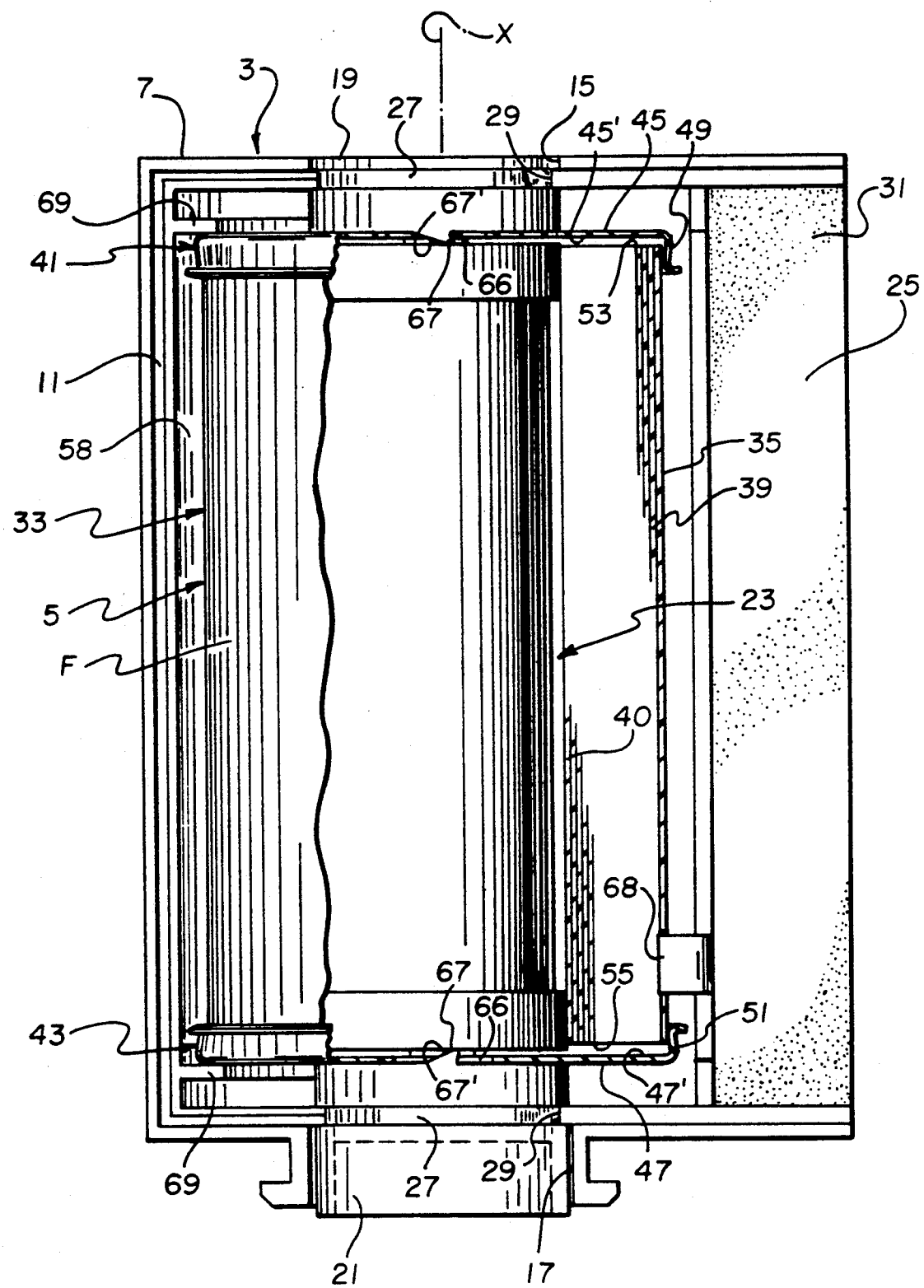
FIG. 13 is an elevation view partly in section of the film roll and the film spool, illustrating the manner in which a pair of film confining flanges of the spool may be fixed via respective engagement hooks to the spool for concurrent rotation with the spool.

A roll 33 of 35 mm filmstrip F is coiled about the spool core 23 to form successive film convolutions. As shown in FIG. 3, the film roll 33 includes an outermost convolution which comprises a film leader 35 having a leading or forward end 37, and it includes a next-inward convolution 39 coiled behind the outermost convolution. The inner or trailing end of an innermost convolution 40 of the film roll 33 is secured to the spool core 23 using known attachment means, not shown. See FIG. 13.

Figure 14:
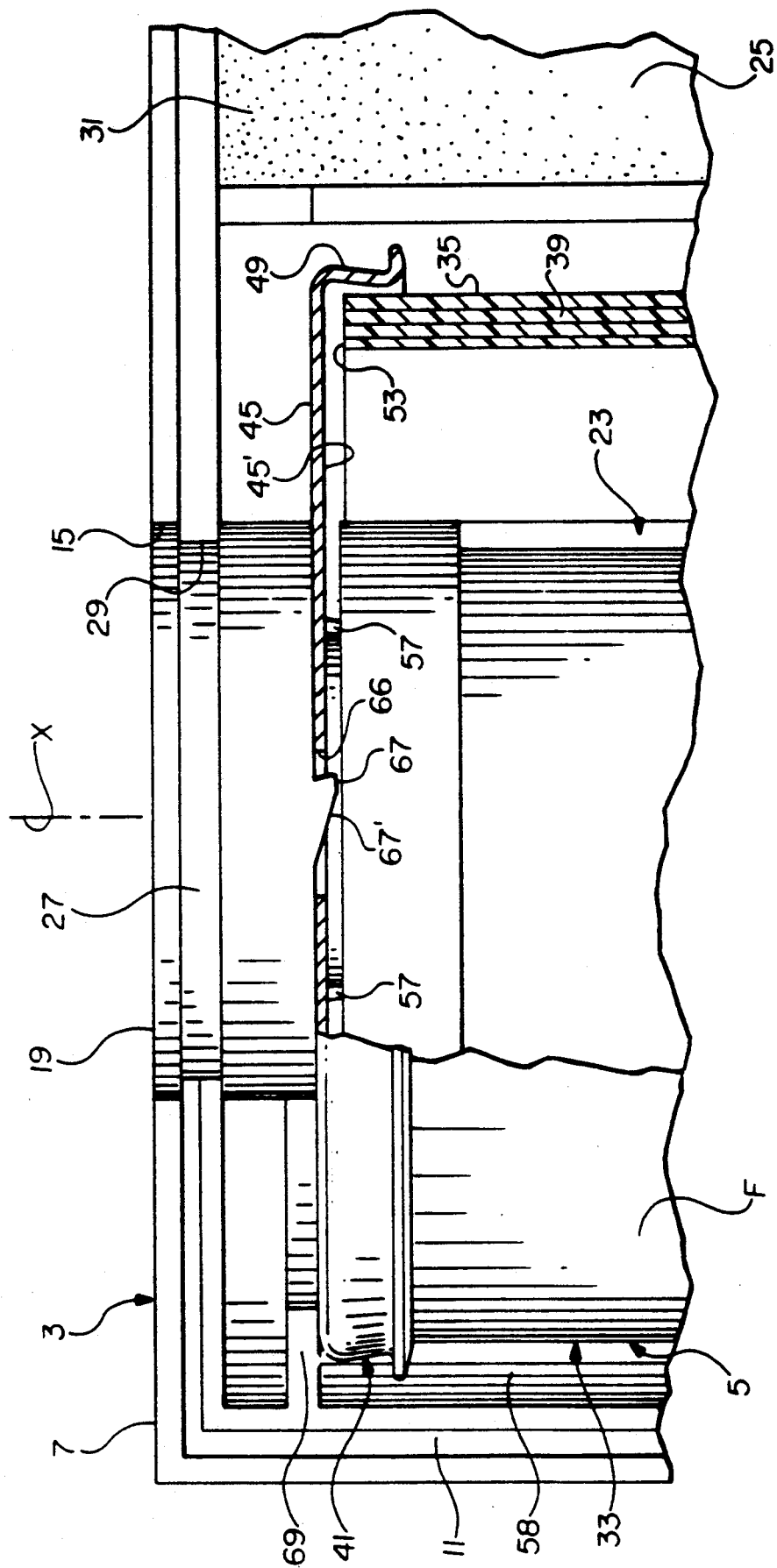
FIG. 14 is a blow-up of a particular portion of FIG. 13, illustrating one of the engagement hooks engaging one of the film confining flanges.
Figure 15:
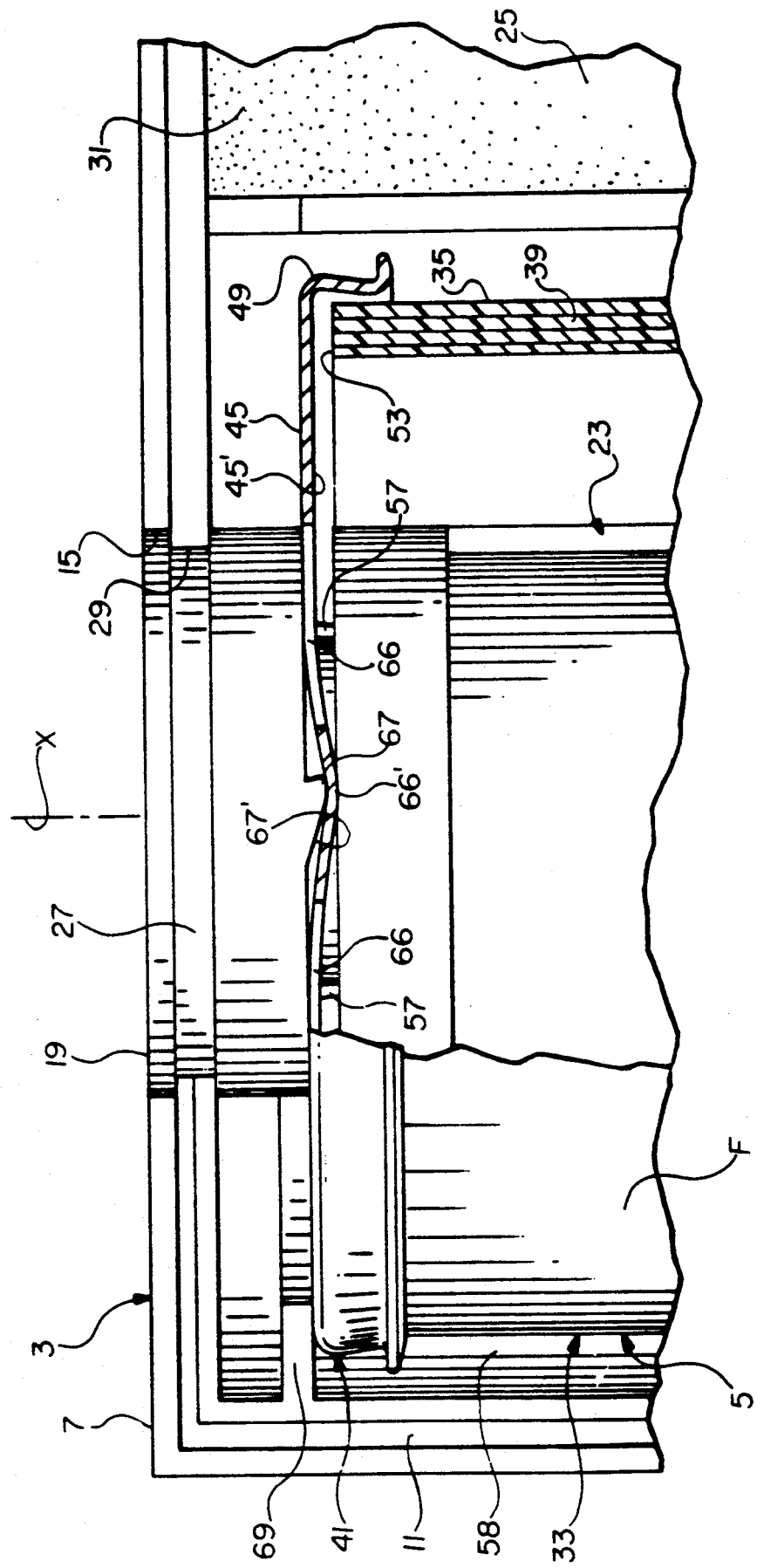
FIG. 15 is a blow-up similar to FIG. 14, illustrating the engagement hook not engaging the film confining flange.

A pair of upper and lower identical, very thin, flexible film constraining flanges 41 and 43 are coaxially spaced along the spool core 23 as shown in FIGS. 1, 2, 8, 12 and 13. The two flanges 41 and 43 comprise respective integral disks 45 and 47 and respective integral annular lips or skirts 49 and 51 which circumferentially extend from the disks. The two disks 45 and 47 cover opposite substantially flat sides of the film roll 33 which are defined by corresponding opposite longitudinal edges 53 and 55 of each successive convolution of the film roll, and they have respective central holes 56 through which the spool core 23 coaxially extends to permit rotation of the spool core relative to the flanges 41 and 43. Respective pairs of supports 57, 57 and 57, 57 are fixed to the spool core 23 to support the flanges 41 and 43 at their disks 45 and 47. See FIGS. 12-14. The two pairs of supports 57, 57 and 57, 57 are sufficiently spaced from one another along spool core 23 to maintain respective inner faces 45' and 47' of the disks 45 and 47 spaced from the longitudinal edges 53 and 55 of each successive convolution of the film roll 33. See FIG. 13. The annular lips 49 and 51 overlap the film leader (outermost convolution) 35 of the film roll 33 radially outwardly of the longitudinal edges 53 and 55 of the leader to radially confine the leader to thus prevent it from radially expanding or clock-springing into substantial contact with an interior curved wall 58 of the cassette shell 3.

A pair of staggered lip-receiving notches 59 and 61 are cut in the film leader (outermost convolution) 35 along its longitudinal edges 55 and 53, relatively close to (nearby) its leading end 37, to receive respective peripheral sections 51' and 49' of the annular lips 51 and 49. This allows relatively short edge-sections 55' and 53' of the film leader (outermost convolution) 35 between the leading end 37 and the notches 59 and 61 to overlap the annular lips 51 and 49 radially outwardly to thus maintain the leading end spaced a radial distance D from the next-inward convolution 39 of the film roll 33. See FIGS. 1, 2 and 9. Similarly, respective edge-tabs 63 and 65 of the film leader (outermost convolution) 35, like the edge-sections 53' and 55', overlap the annular lips 49 and 51 radially outwardly. The notch 61 is sufficiently shallow to cause the peripheral section 49' of the annular lip 49 to bottom out in that notch. This prevents the peripheral section 51' of the annular lip 51 from separating from the notch 59. If the peripheral section 51' were allowed to separate from the notch 59, the edge-tab 65 could slip from overlapping the annular lip 49 to behind (inside) that lip.

The two flanges 41 and 43 have a plurality of concentric arcuate slots 66 cut in their respective disks 45 and 47 to longitudinally extend in the film unwinding and film winding directions U and W. Engagement means in the form of respective hook-like members 67, located on the short and longer open-end pieces 19 and 21 of the spool core 23, are normally located in the concentric slots 66 for movement along the slots into engagement with the flanges 41 and 43 responsive to rotation of the spool core relative to the flanges in the unwinding direction U and for movement along the slots out of engagement with the flanges responsive to rotation of the spool core relative to the flanges in the winding direction W. See FIGS. 12-15. Preferably, each of the hook-like members 67 has an end face 67' that is beveled to ease the hook-like member out of one of the concentric slots 66 responsive to rotation of the spool core 23 relative to the flanges 41 and 43 in the winding direction W, in the possible event the spool core is rotated relative to the flanges far enough in the winding direction to back the hook-like member out of the slot.

The two pairs of supports 57, 57 and 57, 57 are positioned to distort the flanges 41 and 43 at their disks 45 and 47 when the hook-like members 67 are not in the slots 66. See FIG. 15. More specifically, in this instance, the two pairs of supports 57, 57 and 57, 57 distort the flanges 45 and 47 in a manner such that respective flat areas 66' of the disks located between the slots 66 are urged firmly against the hook-like members 67. This will ensure that the hook-like members 67 are received in the slots 66 when the spool core 23 is rotated relative to the flanges 45 and 47 in the unwinding direction W, and thus will engage the flanges. See FIG. 14.

Figure 4:
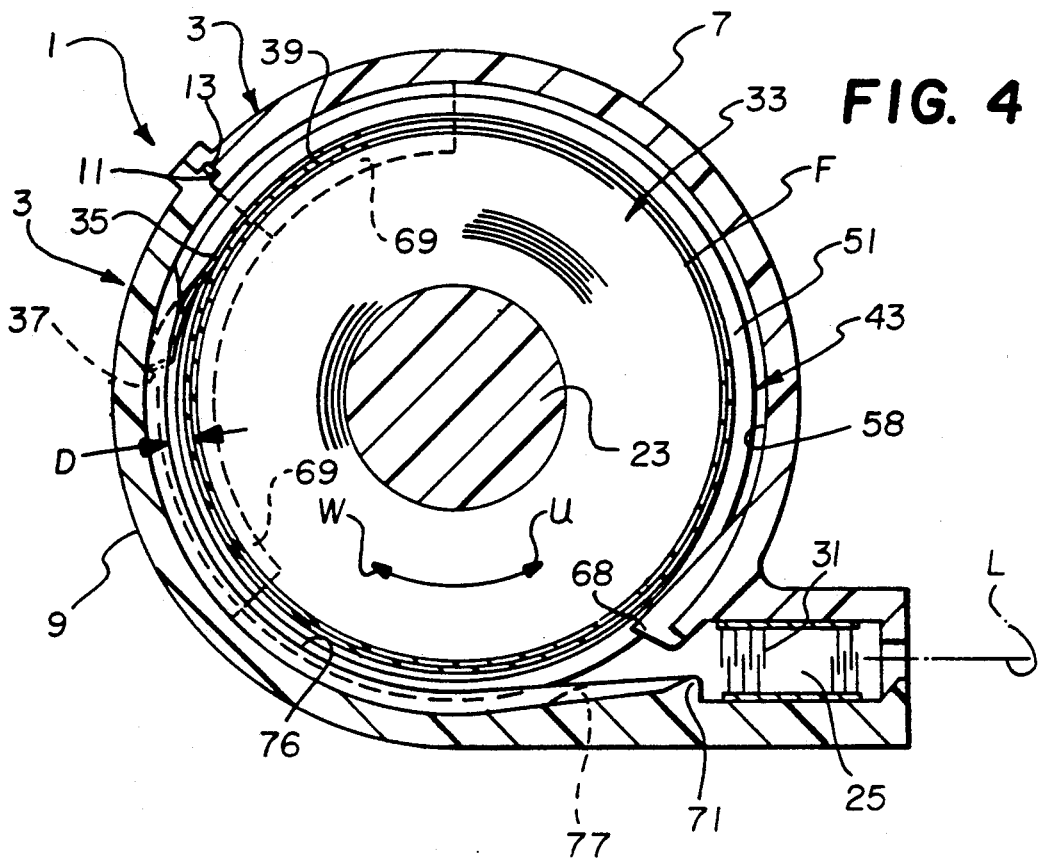
FIG. 4 is an end view partly in section of the cassette shell, the film roll and the film spool, illustrating the manner in which the film roll is originally stored on the film spool.
Figure 5:
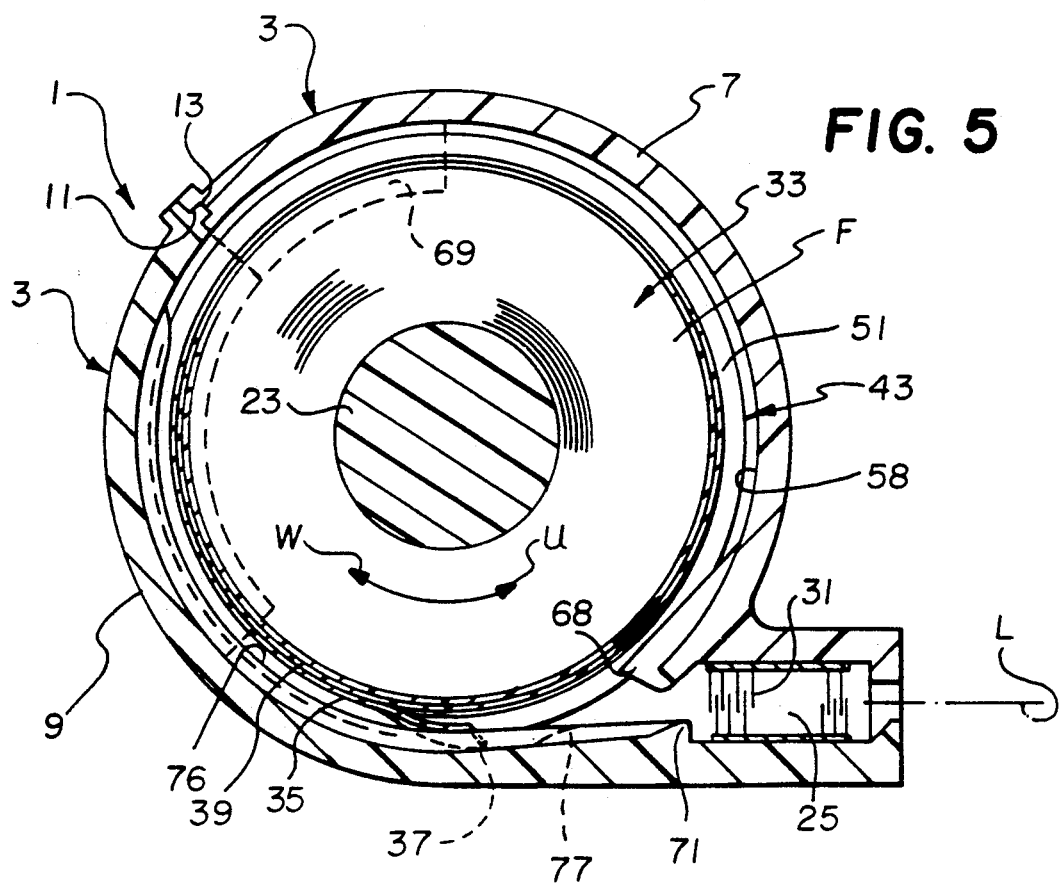
FIGS. 5, 6, and 7 are end views similar to FIG. 4, illustrating the manner in which the film roll is unwound from the film spool.
Figure 6:
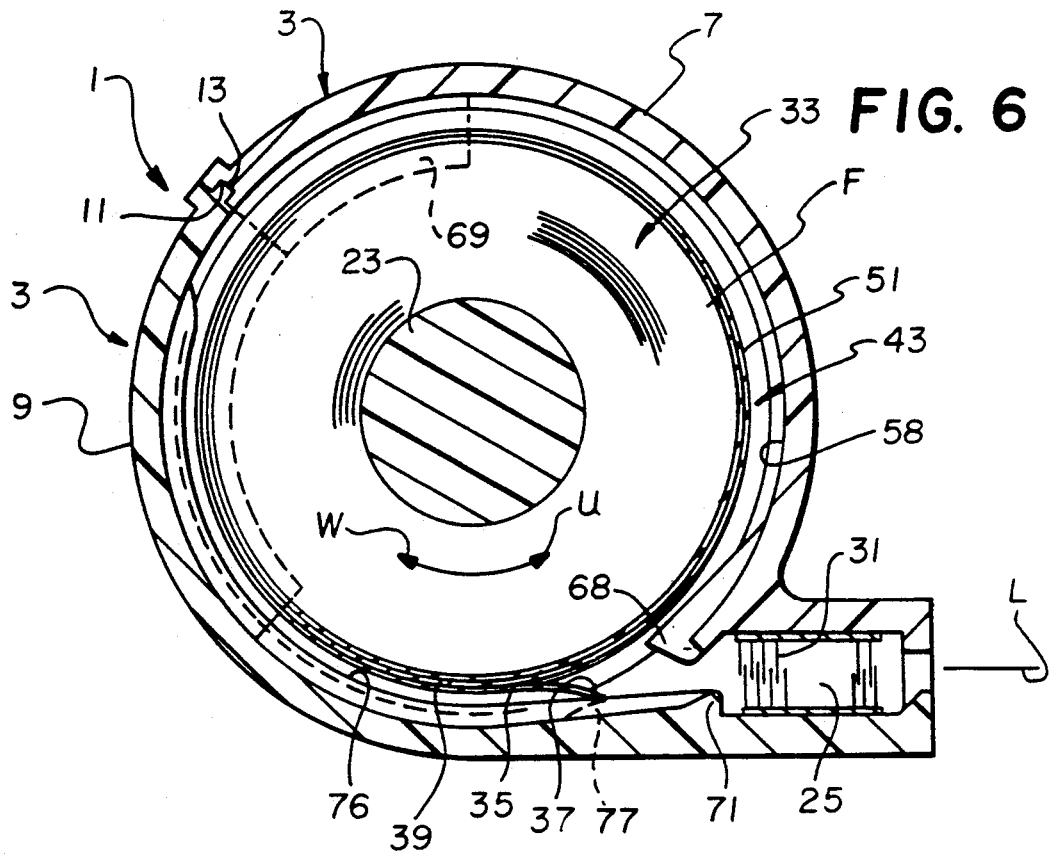
Figure 7:
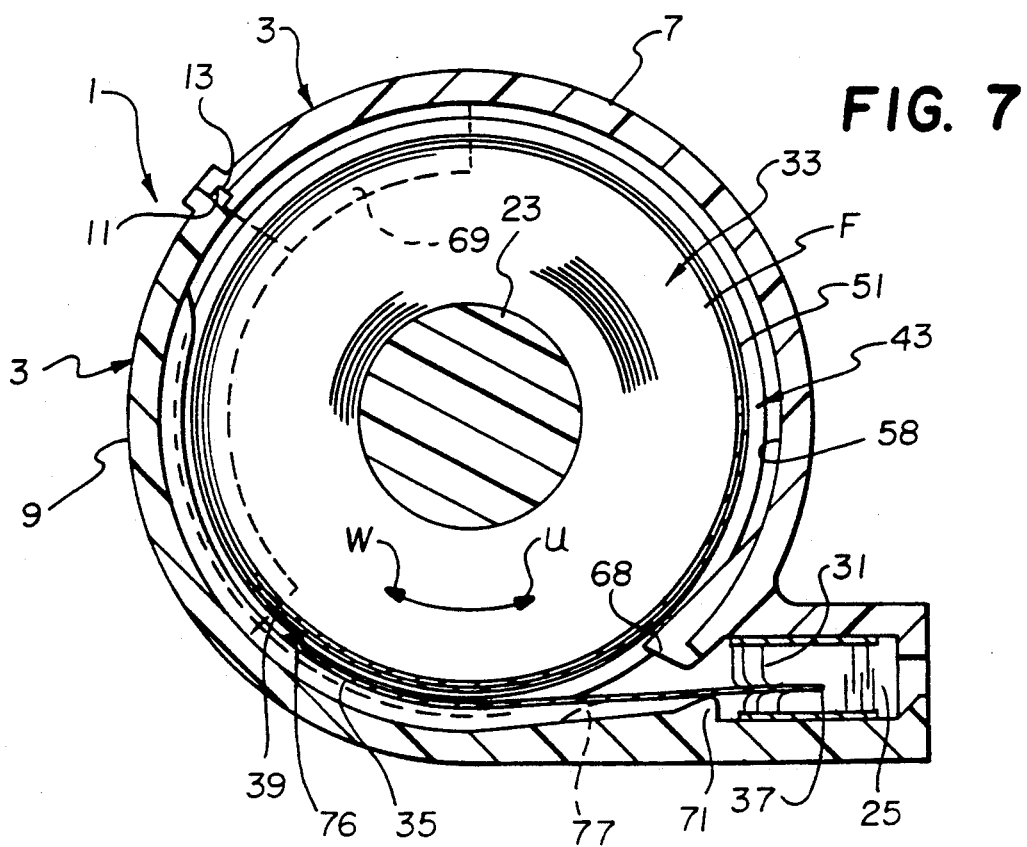

A film stripper-guide 68 projecting from the interior wall 58 of the cassette half 7 is positioned immediately inward of the inner entrance to the film passageway 25 to be received between the leading end 37 of the film leader (outermost convolution) 35 and the next-inward convolution 39, close to the edge-tab 65 of the leader, to pick up the leading end and guide it into the film passageway responsive to rotation of the spool core 23 in the unwinding direction U. See FIGS. 1 and 47-7. The leading end 37 will be advanced over the stripper-guide 68 and into the film passageway 25, rather than between the stripper-guide and the next-inward convolution 39, because it is spaced the radial distance D from the latter convolution. Thus, as shown in FIG. 4, the leading end 37 will be located within range of the stripper-guide 68 due to such spacing D from the next-inward convolution 39.

Figure 10:
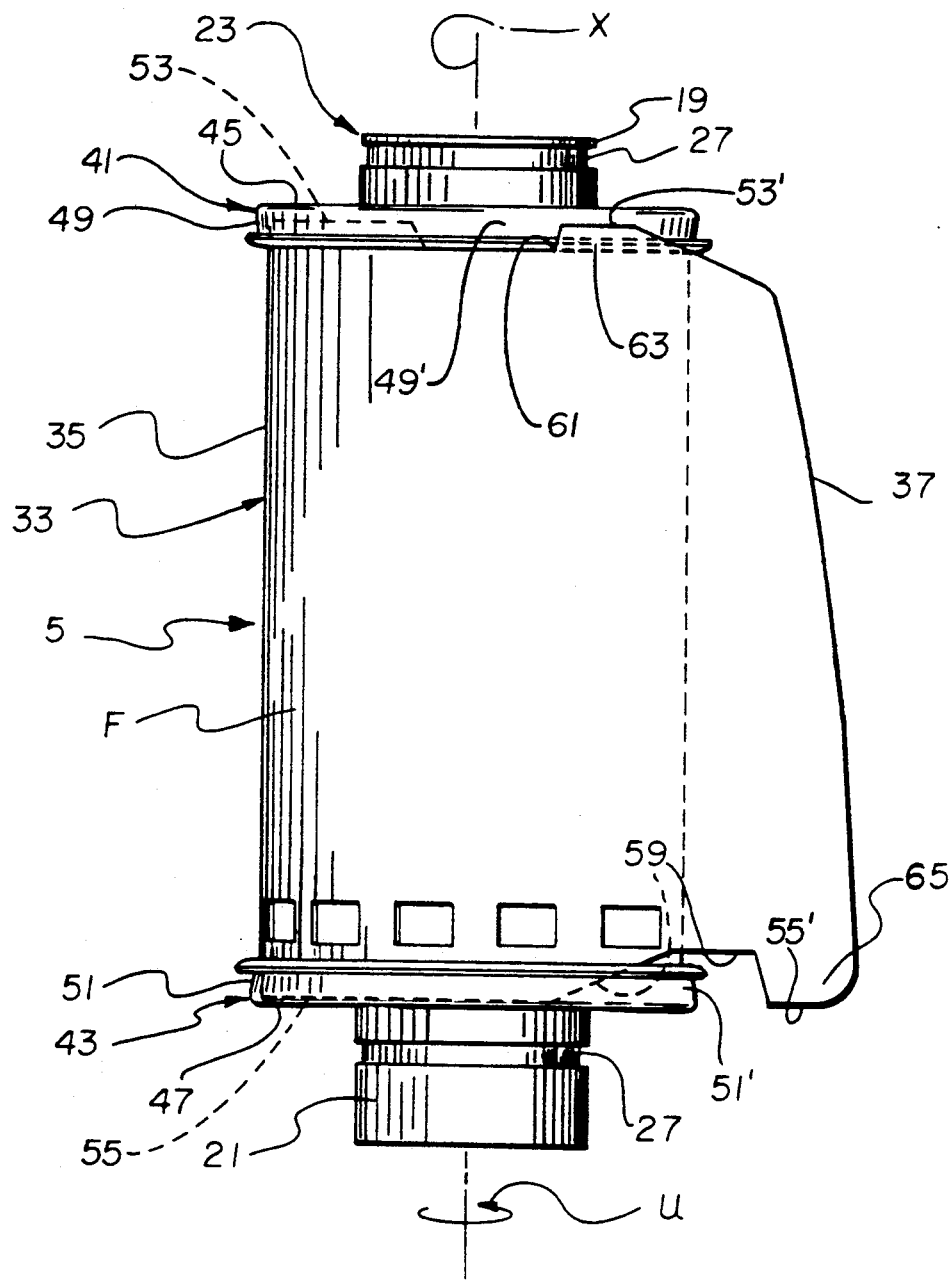
FIGS. 10 and 11 are elevation views similar to FIGS. 8 and 9, illustrating the manner in which the film roll is unwound from the film spool.

When the leading end 37 of the film leader (outermost convolution) 35 is advanced over the stripper-guide 68 responsive to rotation of the spool core 23 in the unwinding direction U, the longitudinal edges 55 and 53 of the leader start to gently flex respective arcuate portions of the two flanges 43 and 41 away from one another, i.e. farther apart, first to allow the notches 59 and 61 to advance from the lip sections 51' and 49', and then to allow successive increments of the leader to uncoil from between the flanges and exit the cassette shell 3. See FIGS. 8, 10 and 11. The flexing of the flanges 41 and 43 occurs because the film width $W_F$ between the longitudinal film edges 53 and 55 is slightly greater than the axial spacing $A_S$ between the annular lips 49 and 51. Moreover, successive convolutions of the film roll 33 have a resistance to transverse bowing that is greater than the resistance of the flanges 41 and 43 to be flexed. Two pairs of flat curved bearing members 69 project from the interior walls 58 of the respective shell halves 7 and 9 to lie flatly against successive arcuate portions of the two disks 45 and 47 as the flanges 41 and 43 are flexed away from one another, to only allow those flange portions separated from the bearing members to be flexed farther apart. See FIGS. 1, 2 and 4. The bearing members 69 are positioned relatively remote from the film passageway 25. Thus, the leader 35 is only allowed to uncoil from between the flanges 41 and 43 relatively close to the passageway 25. See FIG. 7.

A film flattening rib 71 projects from the interior wall 58 of the cassette half 9 in the vicinity of the inner entrance to the film passageway 25 and the stripper-guide 68 to support successive longitudinal sections of the film leader 35, beginning with its leading end 37, substantially flat widthwise as those sections are freed from the flanges 41 and 43, to facilitate movement of the leading end into the passageway. See FIG. 7. The light-trapping plush 31 within the film passageway 25 is elevated along the passageway slightly beyond a longitudinal center line L of the passageway. The film flattening rib 71 as shown in FIG. 4 projects almost to the center line L in order to support successive sections of the film leader 35 substantially flat at the center line.

Two substantially parallel curved film supporting ribs 75 and 76 project from the interior wall 58 of the cassette half 7 to longitudinally extend from the film flattening rib 71 to part-way between the pair of bearing members 69 which project from the same wall. See FIGS. 1, 3, and 4. The film supporting ribs 75 and 76 longitudinally extend the entire location at which the film leader (outermost convolution) 35 can escape the confinement of the flanges 41 and 43, when the leader axially flexes the flanges away from one another. The film supporting ribs 75 and 76 as shown in FIG. 3 are positioned to be slightly spaced from the film leader 35, when the leader is confined within the annular lips 49 and 51. Another film supporting rib 77 projects from the interior wall 58 of the cassette half 7, opposite the stripper-guide 68. The other rib 77 is substantially parallel to and shorter than the first-two ribs 75 and 76. All three of the ribs 75–77 longitudinally extend perpendicular to and adjoin the flattening rib 71. See FIG. 1.

OPERATION

Figure 11:
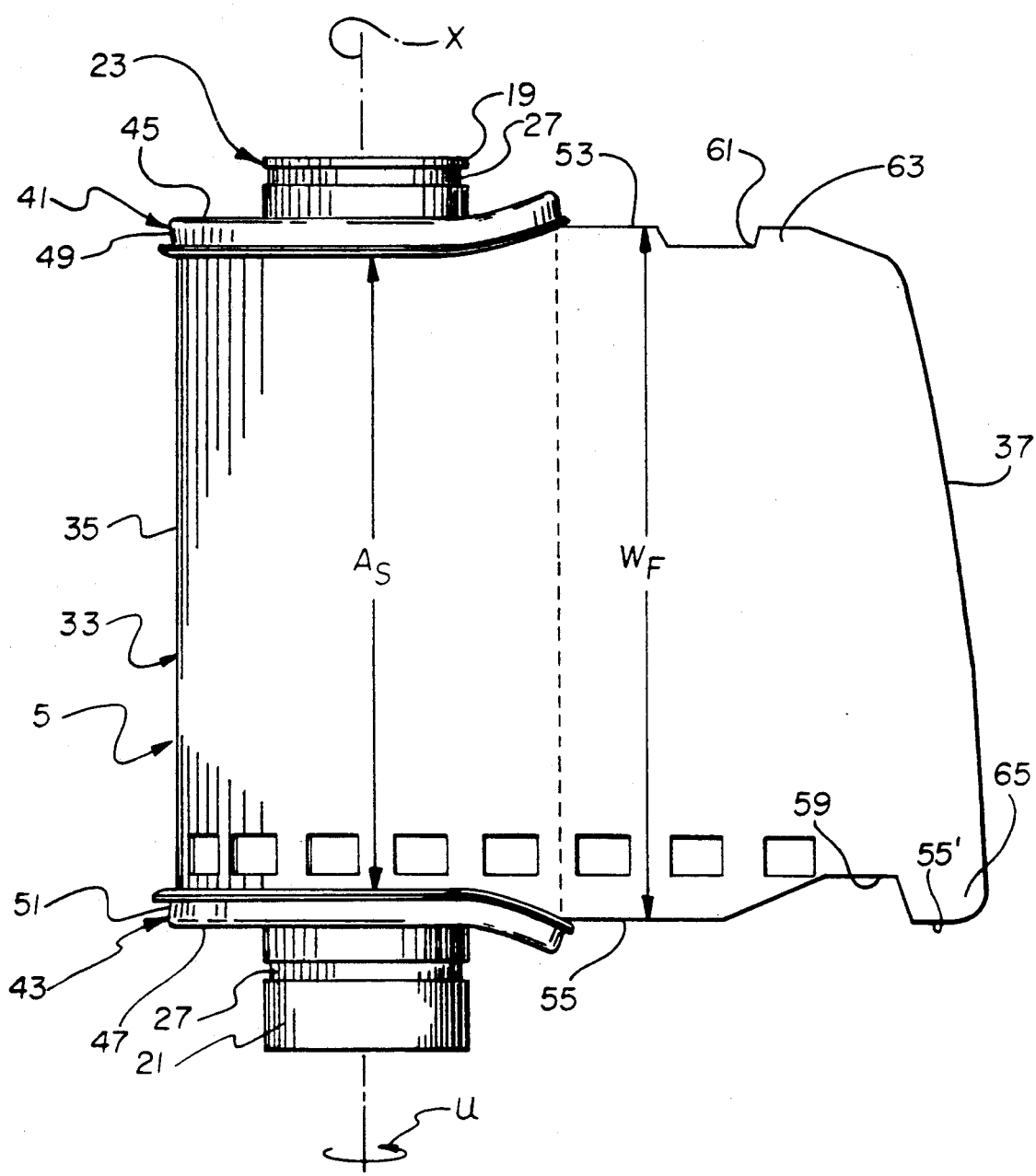

When the spool core 23 is initially rotated in the film unwinding direction U, the two flanges 41 and 43 momentarily tend to remain stationary and the film roll 33, since its inner end is attached to the spool core, will expand radially or clock-spring to force the film leader (outermost convolution) 35 firmly against the annular lips 49 and 51 of the flanges. Generally, however, before the film roll 33 can be expanded radially to the extent a non-slipping relation would be created between the film leader (outermost convolution) 35 and the annular lips 49 and 51, the hook-like members 67 will have moved along the respective slots 66 (or from the flat areas 66' into the slots 66, and then) into engagement with the two flanges 41 and 43 to fix the flanges to the spool core. Then, further rotation of the spool core 23 will similarly rotate the flanges 41 and 43. As a result, the leading end 37 of the film leader (outermost convolution) 35 will be advanced over the shorter rib 77 and the stripper-guide 68, causing successive arcuate portions of the flanges 41 and 43 to be flexed away from one another as shown in FIG. 11. This first allows the notches 59 and 61 to advance from the lip sections 51' and 49', and then it allows successive increments of the film leader 35 to exit from between the flanges and out of the cassette shell 3.

When the film leader 35 is thrust through the film passageway 25 out of the cassette shell 3, the passageway due to the plush material 31 presents some resistance to outward movement of the leader. This resistance causes the leader 35 to further flex the flanges 41 and 43 away from one another to, in turn, allow more of the leader to uncoil from between the flanges. If the two ribs 75 and 76 were omitted from the shell half 9, the leader 35 would uncoil against the interior wall 58 of the shell half. As a result, increased torque would be required to rotate the spool core 23 in the film unwinding direction U. However, the two ribs 75 and 76 serve to severely limit the extent to which the leader 35 can uncoil from between the flanges 41 and 43.

If the spool core 23 is rotated in the film winding direction W after some length of the filmstrip F has been advanced from the cassette shell 3, the spool core is free to rotate relative to the two flanges 41 and 43 because the hook-like members 67 can move along the respective slots 66 out of engagement with the flanges. This permits the flanges 41 and 43 to be independently rotated in the winding direction W, though at a slower speed than the spool core 23 is rotated in that direction. Each of the hook-like members 67 may back out of one of the slots 66 and into the next slot during continued rotation of the spool core 23 in the winding direction W. At the same time, the filmstrip F will be rewound onto the spool core 23 between the flanges 41 and 43.

The invention has been described with reference to a preferred embodiment. However, it will be appreciated that variations and modifications can be effected within the ordinary skill in the art without departing from the scope of the invention.

We claim:

1. A film cassette comprising a spool supported for rotation in an unwinding direction inside a cassette shell, a filmstrip coiled about said spool to form a film roll with an outermost convolution having a leading end, a pair of flanges coaxially arranged along said spool with respective peripheral annular lips overlapping said outermost convolution adjacent opposite longitudinal edges of the outermost convolution to radially confine said film roll, respective notches cut in said longitudinal edges at individual locations nearby said leading end which receive sections of said annular lips to allow sections of the longitudinal edges between said notches and the leading end to overlap the annular lips to hold the leading end spaced from a next-inward convolution of said film roll, and a stripper positioned closer to one of said longitudinal edges than to the other for receipt between said leading end and said next-inward convolution to divert the leading end into a passageway out of said shell when said spool is rotated in the unwinding direction, is characterized in that:

said notch in said longitudinal edge that is farther from said stripper is sufficiently shallow to always make said section of said annular lip in that notch bottom out in it to continuously prevent any lateral shifting of said outermost convolution towards that annular lip, to prevent said section of said annular lip in said notch in said longitudinal edge that is closer to the stripper from separating from that notch.

2. A film cassette as recited in claim 1, wherein said notch in said longitudinal edge that is farther from said stripper is staggered rearwardly with respect to said notch in said longitudinal edge that is closer to the stripper.

* * * * *